UNITED STATES PATENT OFFICE.

HANS WOLFF, OF ZURICH, SWITZERLAND.

PRODUCTION OF NEW AZO COLORS.

SPECIFICATION forming part of Letters Patent No. 389,127, dated September 4, 1888.

Application filed June 3, 1886. Renewed February 29, 1888. Serial No. 265,679. (Specimens.)

*To all whom it may concern:*

Be it known that I, HANS WOLFF, of Zurich, in the Republic of Switzerland, have invented certain new and useful Improvements in Processes for Producing New Azo Colors, of which the following is a specification.

The azo colors hitherto used in dyeing were obtained by azotizing simple or substituted aromatic amido compounds or amidoazo compounds and subsequently combining the thus-obtained diazo or tetrazo compounds with different members of the phenol series or their sulpho-conjugations, or with aromatic amido compounds or their sulpho-conjugations.

I have succeeded in obtaining a series of new and valuable coloring-matters from aromatic diamido compounds by diazotizing them or their sulpho-conjugations, and subsequently combining the thus-obtained bidiazo compounds with aromatic amido or diamido compounds or their sulpho-conjugations, or with members of the phenol series or their sulpho-conjugations. By condensing two molecules of an aromatic amido compound with one molecule of metanitrobenzaldehyde, a nitrodiamido compound of triphenyl-methane, or its respective homologue, is obtained, which by diazotization and subsequent combination with two molecules of any aromatic amido or diamido compound, or a suitable compound of the phenol series, or the sulpho-conjugations of the same, produces the coloring-matters forming the subject-matter of this invention. The fundamental member of this series is the "nitrodiamidotriphenyl-methane," which is obtained by the condensation of two molecules of aniline and one molecule of crude nitrobenzaldehyde, and which has the following chemical constitution and formula:

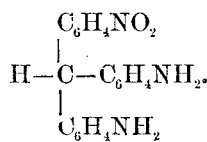

By diazotizing with two molecules of sodium nitrite in a solution of hydrochloric acid the dichlornitrobidiazotriphenyl-methane is obtained of the formula:

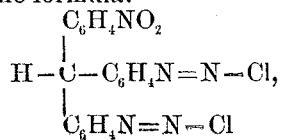

which, added to an alkaline solution of two molecules of beta-naphthol, produces a yellow-red coloring-matter, soluble in alcohol, of the constitution expressed in the following formula:

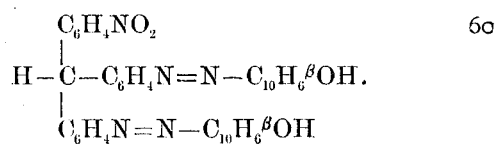

In place of aniline, its homologues can be used in the above condensation with nitrobenzaldehyde—as, for example, toluidine, xylidine, and so on; also, in place of the nitrodiamido compounds, other diamido compounds can be used—as, for example, diamidoditolylphenyl-methane. In place of the sulpho-conjugations of the phenols, the pure phenols in their alkaline solutions can be combined (for the production of water-soluble colors) with the above bidiazosulpho-conjugations, obtained by diazotizing the sulpho-conjugations of the nitrodiamido compounds. The coloring-matters thus obtained possess a greater tinctorial power than the ordinary simple azo colors and are (even when using the lower homologues of the amido compounds) of a purer red, respectively of a more bluish red shade than the former. Of course the coloring-matters thus obtained from the unsulphonated materials are insoluble in water and soluble in alcohol, and as they are not volatile at higher temperatures they are especially adapted for the production of water-soluble compounds by means of sodium bisulphite, which can be used for fast steam colors.

In the following I give an example for the production of coloring-matter of the new series:

*Example I.*—One hundred parts, by weight, of aniline, seventy-nine parts, by weight, of metanitrobenzaldehyde, (crude and containing about twenty per cent. of orthonitrobenzaldehyde,) and two hundred and twenty parts, by weight, of hydrochloric acid of 21° Baumé are boiled for about four hours in a vessel provided with a back-condenser. The thus-obtained liquid is mixed with three thousand five hundred parts, by weight, of water, and, after cooling, a cold solution of seventy-five parts, by weight, of sodium nitrite in seven hundred and fifty parts, by weight, of water is slowly run into the former solution, care being taken that the temperature does not rise. After half an hour the diazotization is completed. The solution of the thus-obtained bidiazo compound is next run into a solution of one hundred and fifty-five parts, by weight, of beta-naphthol and one hundred and twenty-five parts, by weight, of sodium hydrate in two thousand parts, by weight, of water, from which the coloring-matter is precipitated at once. Its color is of an orange-red shade. It is spirit-soluble, and can be rendered water-soluble in the well-known manner by treatment either with sodium bisulphite or concentrated sulphuric acid.

*Example* II.—Two hundred and fourteen parts, by weight, of commercial pseudo-toluidine, one hundred and six parts, by weight, of benzaldehyde, and two hundred and twenty parts, by weight, of hydrochloric acid of 21° Baumé are brought to a boiling-point and kept at it for four hours in a vessel provided with back-condensation, whereby the hydrochloric acid compound of diamidoditolylphenyl-methane is obtained, as per formula:

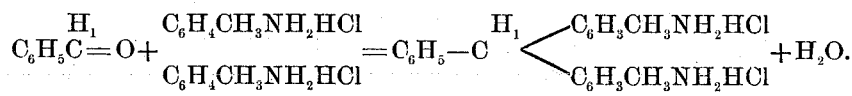

Benzaldehyde ± 2 toluidine hydrochloride = diamidoditolylphenyl-methane hydrochloride ± water.

To the mixture thus obtained are added during continual stirring seven thousand parts of hot water, in order to produce a solution or suspension, to which, after the same has cooled down to about 4° centigrade, is added slowly, under constant agitation, a solution of one hundred and forty parts, by weight, of sodium nitrite in eight hundred and forty parts, by weight, of water, whereby bidiazoditolylphenyl-methane chloride is obtained after standing for about one-half to one hour, as per formula:

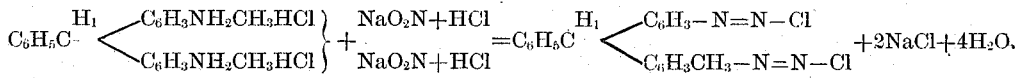

Diamidoditolylphenyl-methane hydrochloride ± 2 sodium nitrate ± 2 hydrochloric acid = bidiazoditolylphenyl-methane chloride ± 2 salt ± 4 water. By this reaction a solution or suspension is obtained containing three hundred and ninety-seven parts, by weight, of bidiazoditolylphenyl-methane chloride, which, by addition of a solution of seven hundred parts, by weight, of sodium betanaphthol-disulphonate (for example) in about five thousand parts, by weight, of water, forms a solution and suspension of the coloring-matter, which is obtained in a dry state by precipitation with salt, filtering, and drying.

*Example* III.—If we add to the solution and suspension above obtained, containing three hundred and ninety seven parts, by weight, of bidiazoditolylphenyl-methane chloride, a solution of two molecules or five hundred parts, by weight, of sodium-naphthylamidomonosulphonate in five thousand parts, by weight, of water, a coloring-matter is obtained pertaining to this invention.

If, instead of the sulpho compounds of the toluidines and phenols or aromatic amines and diamines, the compounds with other acids had been used, whereby colors had been obtained which are insoluble in water, they may be converted into their respective soluble sulpho compounds by treatment with oil of vitriol or fuming sulphuric acid or obtained in a reduced state by treatment with sodium bisulphite in the well-known manner.

Having thus described my invention, I claim as new and desire to secure by Letters Patent—

1. The process herein described of producing azo colors, which consists in diazotizing nitrodiamidotriphenyl-methane or its sulpho-conjugations, and combining it with an aromatic amido or diamido compound, phenols, or their sulpho-conjugations, substantially as set forth.

2. The new dye-stuff or coloring-matter herein described and produced by the reaction of a bidiazoditolylphenyl-methane compound with an amido or diamido compound, or a compound of the phenol series, substantially as set forth.

In testimony that I claim the foregoing as my invention I have signed my name in presence of two subscribing witnesses.

HANS WOLFF.

Witnesses:
LILIENERON,
MÜLLER SPRECHER.